United States Patent [19]

Rozsa

[11] Patent Number: 4,559,448
[45] Date of Patent: Dec. 17, 1985

[54] METHOD AND DEVICE FOR MEASURING BACKLASH IN A DRIVE MECHANISM COMPRISING A SCREW AND A NUT

[75] Inventor: Kalman Rozsa, Järfälla, Sweden

[73] Assignee: Facit Aktiebolag, Atvidaberg, Sweden

[21] Appl. No.: 466,652

[22] PCT Filed: May 17, 1982

[86] PCT No.: PCT/SE82/00177
§ 371 Date: Feb. 15, 1983
§ 102(e) Date: Feb. 15, 1983

[87] PCT Pub. No.: WO82/04477
PCT Pub. Date: Dec. 23, 1982

[30] Foreign Application Priority Data

Jun. 18, 1981 [SE] Sweden ............................. 8103841

[51] Int. Cl.⁴ .............................................. G01D 5/34
[52] U.S. Cl. ........................ 250/231 SE; 250/237 R; 340/347 R
[58] Field of Search ................ 250/231, 237; 340/347; 101/DIG. 25

[56] References Cited

U.S. PATENT DOCUMENTS

| | | | |
|---|---|---|---|
| 3,749,925 | 7/1973 | Hertrich | 250/237 |
| 3,818,224 | 6/1974 | Schmidt | 250/237 |
| 4,117,320 | 9/1978 | Tomlinson et al. | 250/237 |
| 4,247,214 | 1/1981 | Swan, Jr. | 250/237 |

Primary Examiner—David C. Nelms
Assistant Examiner—J. Gatto
Attorney, Agent, or Firm—Roberts, Spiecens & Cohen

[57] ABSTRACT

A method of measuring of backlash arising in a drive mechanism comprising a screw and a nut device cooperating with the screw, the nut device being connected to a movable unit which is displaceable in opposite directions along the screw. The drive mechanism comprises a pulse generating system of which the number of pulses emitted for each displacement corresponds to the distance traveled in accordance with the method the movable unit is operated to move away from an end position adjacent one end of the screw, and when a predetermined position has been reached the pulse counter is reset while the movement continues. The movement is maintained a distance beyond the position in which the pulse counter was reset, the distance being greater than the possible maximum backlash. The drive mechanism is then stopped and operated to move the movable unit back to the end position, during which movement the pulse counter is counting backwards. Upon arrival of the movable unit in the position in which the pulse counter was reset, the counting is stopped and the absolute value remaining in the pulse counter will be a measure of the backlash. A control device, preferably a microprocessor is provided for operating the various elements such as the drive mechanism, pulse emitter, pulse counter etc., in carrying out the different method steps.

8 Claims, 15 Drawing Figures

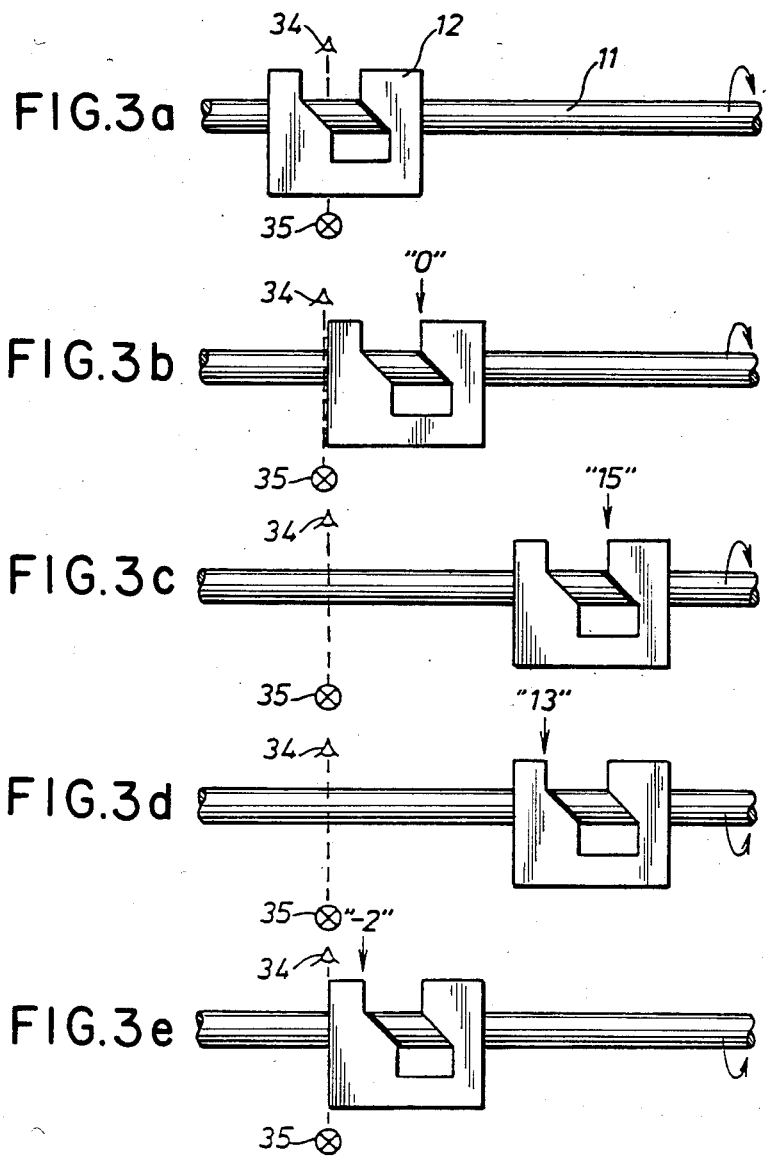

METHOD AND DEVICE FOR MEASURING BACKLASH IN A DRIVE MECHANISM COMPRISING A SCREW AND A NUT

FIELD OF THE INVENTION

The present invention relates to a method and device, respectively, for measuring backlash arising in a drive mechanism comprising a screw and a nut device, the latter being connected to a unit which is movable in opposite directions along the screw. Preferably, the movable unit is a printing unit which is part of a printer or a typewriter. The drive mechanism comprises pulse generating means in which the number of emitted pulses for each displacement corresponds to the distance covered. A pulse counting means is provided for counting of pulses emitted by the pulse generating means.

BACKGROUND

In a drive mechanism of the above kind, an axial backlash must exist between the screw and the nut in order for the latter to be moved along the screw. In matrix printers, wherein the characters are formed by printing of dots and wherein the printing unit is moved in opposite directions along the screw, the backlash will cause the printing unit to take a first position when moving in one direction and to take a second position, different from the first position, when moving in the opposite direction.

In order to eliminate or reduce the influence of the inaccuracy connected with screw drive mechanisms, various nut means have been constructed which are spring-biassed so as always to bear on the same side of a groove joining two adjacent threads of the screw. However, it is not possible to completely eliminate the backlash because in such a case the nut would not be movable along the screw or would move at a speed which would be considerably reduced.

SUMMARY OF THE INVENTION

The invention represents a different way of thinking and its main object is to provide a measurement value, the magnitude of which represents the backlash, and to present this measurement value in a shape that can be easily treated bya backlash correcting equipment working digitally.

BRIEF DESCRIPTION OF THE FIGURES OF THE DRAWING

Other objects and advantages related to the invention will appear from the following description of an embodiment with reference to the accompanying drawings.

FIGS. 3a-3e show conditions to illustrate the principle of measuring the backlash according to the invention.

DETAILED DESCRIPTION OF PREFERRED EMBODIMENT

Figure 1:
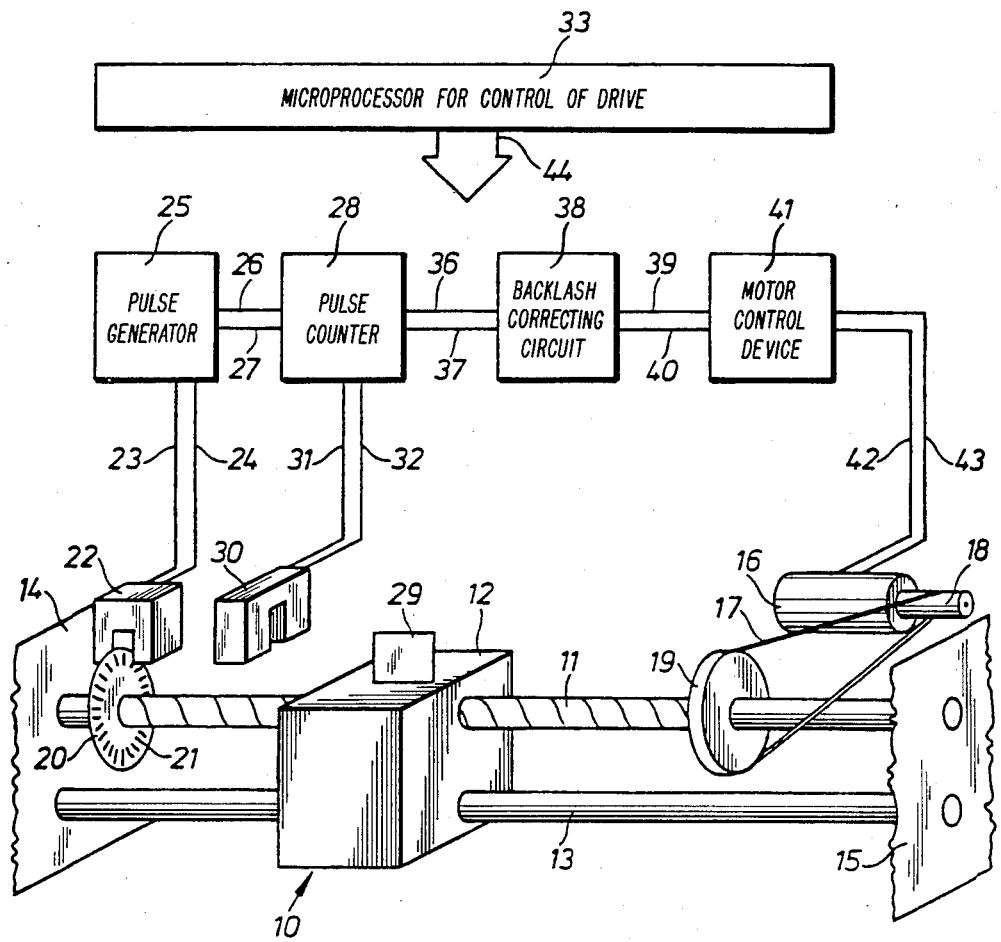
FIG. 1 is a schematic perspective view according to the invention of a drive mechanism including a screw and a nut as well as electric and electronic functional elements.

With reference to FIG. 1 a drive mechanism 10 comprises an elongate screw 11 and a nut device, not shown, which co-operates with the screw and is non-rotatably connected to a movable unit 12, e.g. a printing unit which is movable in opposite directions along a platen, not shown. The movable unit 12 is guided by a rod 13 which runs parallel to the screw and is secured to end walls 14, 15 of a machine frame, not otherwise shown in detail. The screw 11 is mounted for rotation in bearings, not shown, in the end walls 14, 15 and is reversibly driven by a motor 16, the rotatable shaft 18 of which is connected via a cog belt 17 to a driving wheel 19 secured to the screw.

For determining the instant position of the movable unit 12 along the screw 11, the latter is fixedly connected to a code disc 20 with slits 21, each of which corresponds to a predetermined position of each group of positions passed during one complete revolution of the code disc. The code disc co-operates with a photo-electric device 22 comprising a light-emitting diode and a phototransistor. The photo-electric device is electrically connected to a pulse generator 25 via conductors 23, 24 to activate the pulse generator to emit pulses. Each of the said pulses corresponds to a predetermined position, and by transferring the pulses via conductors 26, 27 to a pulse counter 28 it is possible to determine the position of the movable unit from the instant count in the pulse counter.

As will be described in detail below, the object of the invention is to determine the magnitude of the backlash between the screw 11 and the nut device, not shown, mounted in the movable unit 12. To this end, the movable unit is provided with a screen 29 which co-operates with an additional photo-electric device 30 of the same kind as the device 22. With the movable unit 12 in its left end position adjacent the left end of the screw 11, the screen 29 prevents light transmission in the photo-electric device 30. However, such light transmission is allowed when the movable unit has moved a short distance away from its end position. The photo-electric device 30 emits control pulses via conductors 31, 32 to the pulse counter 28, the function of which will appear below. A logical device 33 constituted as a microprocessor is provided for the control of the drive mechanism as well as of the means required for measuring of the backlash. In FIG. 1 the control function is indicated only by an arrow 44.

Figure 2A:
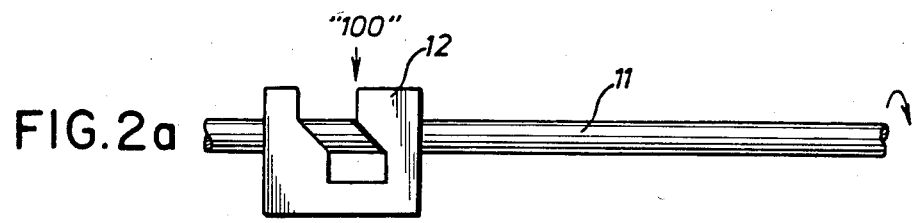
FIGS. 2a-2d, show four conditions which show the principle by which the backlash between the screw and nut influences the positioning of a movable unit.
Figure 2B:
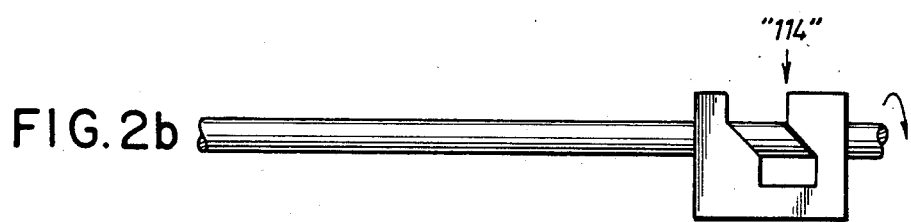
Figure 2C:
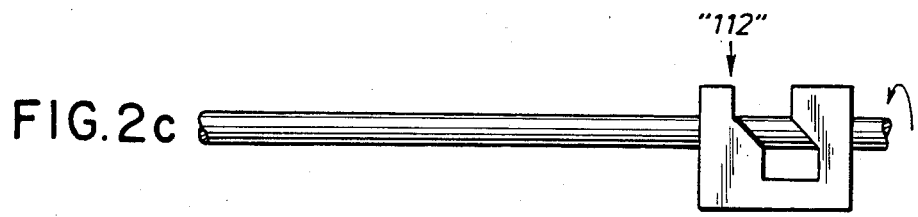
Figure 2D:
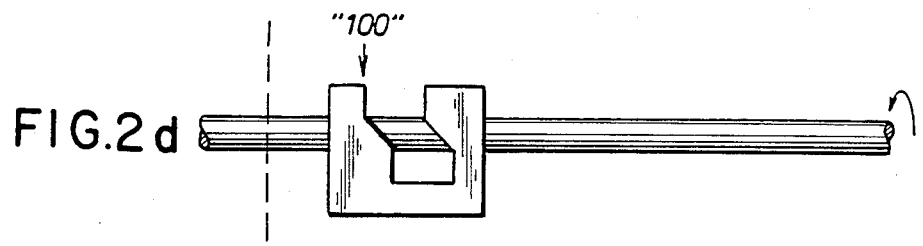

In FIGS. 2a-d is shown how the presence of backlash in the drive mechanism 10 makes it difficult to position the movable unit 12 correctly. In FIG. 2a the movable unit has taken the position "100" after having moved from its left end position. This position has been determined by counting the pulses emitted under the control of the code disc 20. In FIG. 2b the movable unit has been further moved to the right to take the position "114". During the subsequent return movement to the position "100" problems will arise caused by the screw turning through a certain angle corresponding to the backlash before engaging the nut device for movement. In FIG. 2c the engagement between the screw and nut is shown to take place in the position "112" and hence, when the code disc indicates that the position "100" has been reached, the actual position of the movable unit is the position "102" as illustrated in FIG. 2d.

In order to eliminate as far as possible the influence of the backlash, the invention proposes a backlash measurement procedure to take place, in which the first step is movement of the movable unit 12 from its left end position to the right, as illustrated in FIG. 3a. The screen 29, which moves with the movable unit, after a short distance leaves the light path in the photo-electric device 30 resulting in a signal sent on conductors 31, 32 for resetting of the pulse counter 28. The resetting position will be referred to as measuring position "0". In FIGS. 3a-3d, the photo-electric device is represented by an eye 34 and a light source 35. After resetting of the pulse counter, the movement of the movable unit continues a distance which is greater than the maximum backlash in the embodiment up to the measuring position "15", as shown in FIG. 3c. In FIG. 3d the direction of rotation of the screw is reversed and the movable unit starts moving back towards the left end position. The nut device is assumed to be engaged in measuring position "13". During the return movement, the position will be passed in which the pulse counter was reset. In this position, the light path in the photo-electric device 30 will be cut off by the screen 29, and the corresponding signal emitted on the conductors 31, 32 is used to stop the pulse counter 28. The position in which the pulse counter is stopped is not the measuring position "0" but position "−2", indicated by the pulse counter and, hence, the absolute value of the pulse counter will be a measure of the backlash in the drive mechanism expressed in number of positions according to the code disc 20.

FIG. 1 shows an example of using the value in the pulse counter 28, which represents the backlash, for backlash-correcting purposes by transferring this value via conductors 36, 37 to a backlash-correcting circuit 38. The correcting circuit is connected via conductors 39, 40 to a motor control device 41, which in turn via conductors 42, 43 is connected to the motor 16. When the movable unit 12 is to be moved to a predetermined position, the motor 16 is started and the drive mechanism is operating until the count in the pulse counter 28 coincides with a preset value corresponding to the predetermined position. In this position the motor 16 is stopped by the motor control device 41. According to one proposed method of correcting or compensating for the backlash, the backlash is first measured in the manner indicated above and the measured value, as represented by the number of positions indicated by the pulse counter 28, is stored in the backlash-correcting circuit 38. Then, during the normal operation of the drive mechanism the stored value is added to the instant value in the pulse counter 28 as a positive or negative addition. Such a correction must be made every time the direction of rotation of the screw is reversed.

Figure 4:
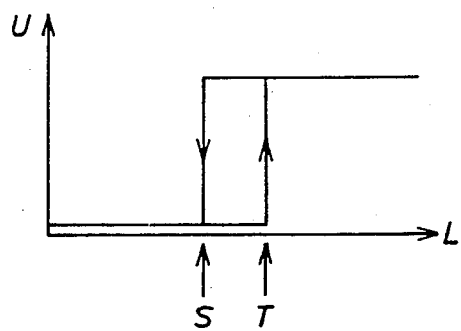
FIG. 4 illustrates the hysteresis of a phototransistor used as a light detector.

In measuring the backlash, various sensors may be used to initiate resetting of the pulse counter as well as stopping the same after the measuring has been completed. Independent of type, the sensors are constructed such that when the movable unit is in its end position they emit a signal of a first level and when the movable unit is positioned remote from the end position they emit a signal of a second level. It is desirable that the signal from the sensor when being at one level cannot change into the opposite level due to electric interference. This is achieved if sensors are used which have a certain degree of hysteresis, i.e. the point of change of the signal from the first to the second level is different from the point of change from the second to the first level. The photo-electric device used in the embodiment described has such a hysteresis characteristic, as illustrated in FIG. 4 wherein U represents the output voltage from the sensor as a function of the amount of light L sensed. The switch-on level T, i.e. the amount of light required for the photo-electric device to switch from the low to the high signal level, is clearly different from the switch-off level S at which the photo-electric device switches from the high to the low signal level.

Figure 5:
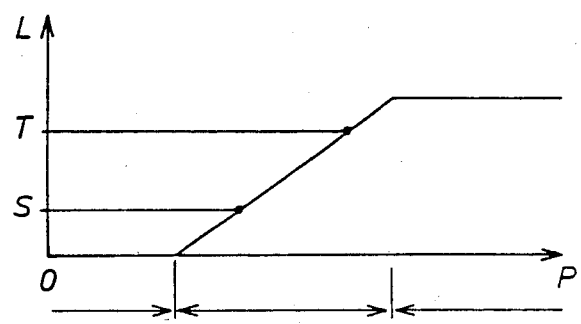
FIG. 5 is a diagram illustrating the relation between light detected by the phototransistor of a photo-electric assembly as a function of the position of a screen member co-operating with the photo-electric assembly and supported by the movable unit.
Figure 6:
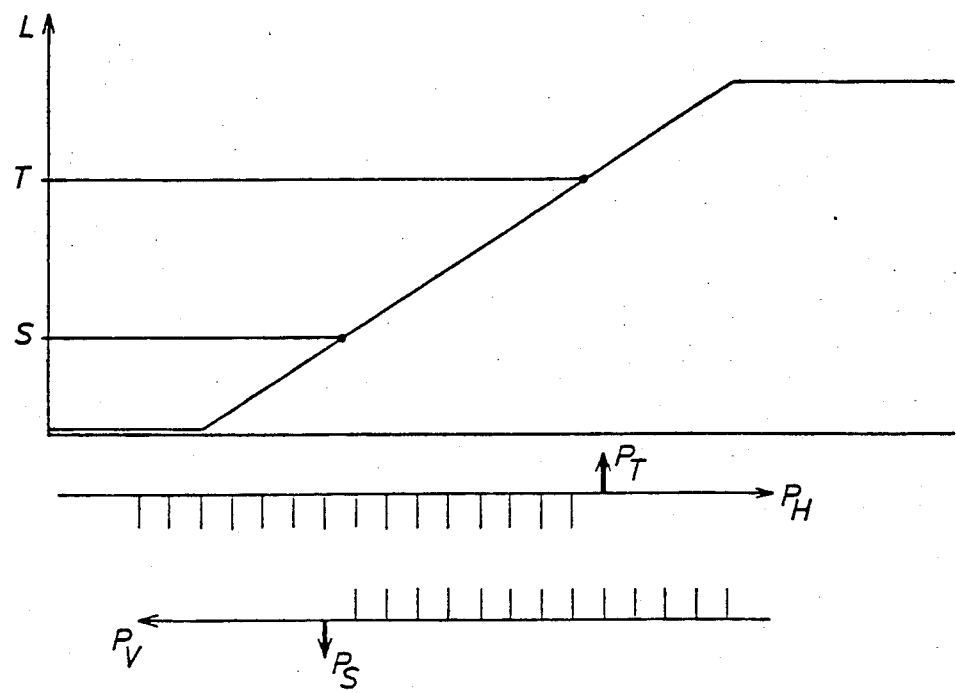
FIG. 6 is a diagram related to the variation of light intensity, similar to FIG. 5, but related to the position of the movable unit and indicating the error in measurement due to the hysteresis of the phototransistor.

Although on the one hand being positive in operation, the hysteresis of the sensor, however, also involves the disadvantage of errors in measurement due to the separated switching points of the sensor signal. FIG. 5 shows a diagram of the amount of light L as a function of the position P of the movable unit and with O designating the left end position along the screw 11. As shown in FIG. 5, during the first part of the movement of the movable unit 12 the light detector in the photo-electric device 30 is completely screened from the light emitted from the light source. This first part of the movement is followed by a distance along which the light increases linearly up to the maximum level at which the light source can unimpededly illuminate the light detector. Along the linear distance the switching points for the output signal of the photo-electric device have been indicated, the switching points being represented by switch-on level T and switch-off level S. In FIG. 6 as well as in FIG. 5 the variation in light has been shown as related to the position of the movable unit. Moreover the horizonal position axis $P_H$ has been drawn up for the movement to the right and along this axis positions determined by the code disc 20 have been set off. A thick upward arrow $P_T$ points at the first position in which the switch-on level has been reached and the signal in the photo-electric device 30 has changed to the high level. Below the axis $P_H$ a similar position axis $P_V$ has been drawn up for the movement to the left along the screw 11. A downward arrow $P_S$ points at the first position in which the switch-off level has been reached and the signal in the photo-electric device has changed to the low level. The distance between the arrows $P_T$ and $P_S$ represents the error in measurement.

Figure 7:
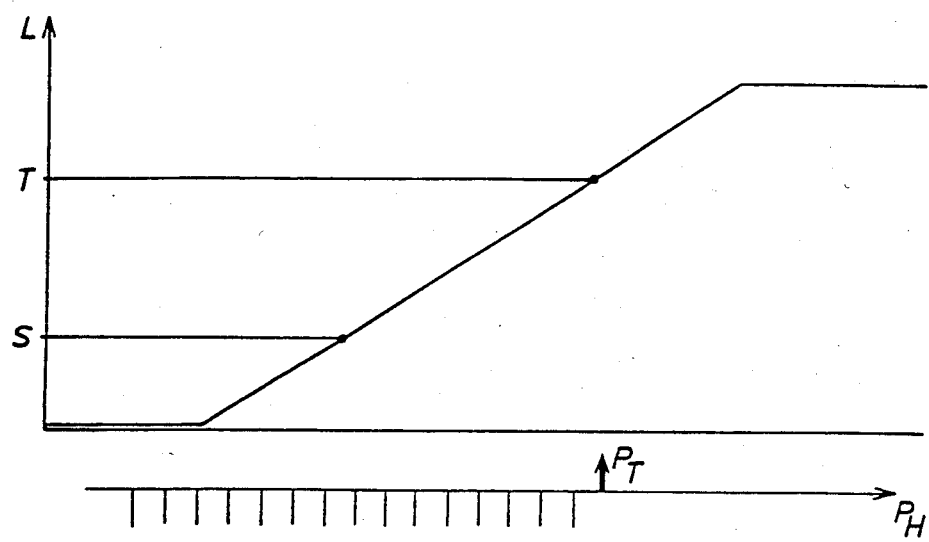
FIGS. 7 and 8 are diagrams similar to FIG. 6 and additionally show the technique of the invention in eliminating the error of measurement caused by the hysteresis of the phototransistor.
Figure 8:
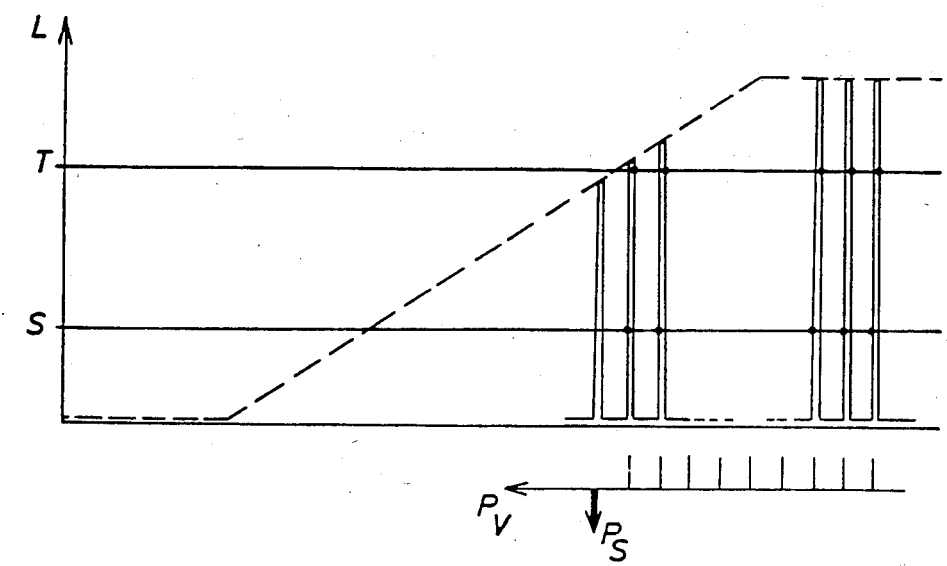

Another object of the invention is to provide a method of eliminating the error in measurement indicated above. The method proposes the use of the switch-on level to initiate the change in signal level also during the movement to the left along the screw 11. As will appear from FIG. 7 the movement to the right goes on in the same way as already described with reference to FIG. 6. The change of level in the signal from the photo-electric device occurs at the upward arrow $P_T$. During this movement the light source in the photo-electric device 30 operates continuously. In FIG. 8 the left-going movement is shown and in accordance with the teachings of the invention the light source is operated to emit light pulses, the period of which is related to the angular distance between two adjacent slits 21 in the code disc 20 representing the distance between adjacent positions along the screw 11. According to the method, the light source is lit in each position and information as to whether the switch-on level has been reached or not is taken from the light detector, whereafter the light source is immediately switched off. As appears from FIG. 8 a change will take place in the first position $P_S$ in which the switch-on level is not reached. From a comparison with FIG. 7 it is clear that the distance between $P_T$ and $P_S$ is equal to the distance between two adjacent positions and accordingly, the error in measurement has been reduced to a negligible level.

What is claimed is:

1. A method for measuring backlash arising in a drive mechanism comprising a screw (11) and a nut device co-operating with the screw, the nut device being connected to a movable unit (12) displaceable in opposite directions along the screw, preferably a printing unit of a printer or a typewriter, the drive mechanism comprising a pulse generating means (20,22,25), the number of emitted pulses of which for each displacement corresponding to the distance run, and a pulse counting means (28) being provided for counting of the pulses emitted by the pulse generating means, said method comprising moving the movable unit (12) away from an end position adjacent one end of the screw, resetting of the pulse counting means (28) during the continued movement of the movable unit, maintaining the movement a distance beyond the position in which the pulse counting means was reset that is greater than the greatest possible value of the backlash, stopping the drive mechanism, moving the movable unit (12) in the reversed direction towards the end position during which movement the pulse counting means (28) counts backwards, and stopping the pulse counting means in a position in which the pulse counting means was reset, wherein the absolute value remaining in the pulse counting means (28) will be a measure of the backlash.

2. A method according to claim 1, wherein the resetting of the pulse counting means (28) is initiated by a photo-electric device (30) comprising a light source and a light detector, the photo-electric device co-operating with a screening member (29), said method further comprising operating the light source to emit steady light during the movement away from the end position, while operating the light source to emit light pulses during the return movement.

3. A method according to claim 2, comprising choosing the period of the light pulses so as to equal the period of the pulses emitted by the pulse generating means (20,22,25).

4. A device for measuring backlash arising in a drive mechanism (10) comprising a screw (11) and a nut device co-operating with the screw, the nut device being connected to a movable unit (12) which is displaceable in opposite directions along the screw, preferably a printing unit in a printer or a typewriter, a pulse generating means (20,22,25) for emitting pulses, the number of which for each displacement of the movable unit (12) corresponding to the distance traveled, and a pulse counting means (28) for counting the pulses emitted, said device comprising a control device (33) to activate the drive mechanism (10) to move the movable unit (12) a predetermined distance away from an end position adjacent one end of the screw, the control device (33) operating the drive mechanism (10) to stop the movable unit (12) when the predetermined distance has been passed and to move the movable unit (12) back to the end position, a signal emitting means (30) to be operated by the movable unit (12) to emit a signal for resetting of the pulse counting means (28) upon arrival of the movable unit at a predetermined position during the movement of the unit away from its end position, the signal emitting means (30) being operated by the movable unit (12) to emit a signal to stop the pulse counting means (28) upon arrival of the movable unit at the said predetermined position during the return movement.

5. A device according to claim 4, wherein the signal emitting means (30) comprises a light source and a light detector placed in the predetermined position and co-operating with a screening member (29) secured to or integral with the movable unit (12).

6. A device according to claim 5, wherein the screening member (29) operates to prevent light from reaching the light detector when the movable unit (12) is in the end position, the light path being opened when the movable unit, during the movement from the end position, passes the predetermined position.

7. A device according to claim 6, wherein the light source is operated to emit steady light during the movement of the movable unit (12) away from the end position and to emit light pulses during the return movement.

8. A device according to claim 7, wherein the period of the light pulses equals the period of the pulses emitted by the pulse generating means (20,22,25).

* * * * *